United States Patent [19]

Speca et al.

[11] Patent Number: 6,087,291
[45] Date of Patent: *Jul. 11, 2000

[54] POLYMERIZATION CATALYST SYSTEMS

[75] Inventors: Anthony Nicholas Speca, Kingwood; Jeffrey Lawrence Brinen, League City; George Alan Vaughan, Houston; Patrick Brant, Seabrook; Terry John Burkhardt, Kingwood, all of Tex.

[73] Assignee: Exxon Chemical Patents, Inc., Baytown, Tex.

[*] Notice: This patent issued on a continued prosecution application filed under 37 CFR 1.53(d), and is subject to the twenty year patent term provisions of 35 U.S.C. 154(a)(2).

[21] Appl. No.: 08/959,965

[22] Filed: Oct. 24, 1997

Related U.S. Application Data

[63] Continuation of application No. 08/688,418, Jul. 30, 1996, abandoned, which is a continuation of application No. 08/413,140, Mar. 29, 1995, abandoned, which is a continuation-in-part of application No. 08/265,532, Jun. 24, 1994, abandoned.

[51] Int. Cl.$^7$ .............................. B01J 31/00; B01J 37/00; C08F 4/02; C08F 4/60
[52] U.S. Cl. ......................... 502/104; 526/160; 526/943; 502/103; 502/107; 502/108; 502/117; 502/113; 502/118; 502/152; 502/155
[58] Field of Search ..................................... 502/103, 104, 502/107, 108, 113, 117, 118, 152, 155

[56] References Cited

U.S. PATENT DOCUMENTS

| | | |
|---|---|---|
| 4,701,432 | 10/1987 | Welborn, Jr. . |
| 4,808,561 | 2/1989 | Welborn, Jr. . |
| 4,897,455 | 1/1990 | Welborn, Jr. . |
| 4,912,075 | 3/1990 | Chang . |
| 4,914,253 | 4/1990 | Chang . |
| 4,935,397 | 6/1990 | Chang . |
| 4,937,217 | 6/1990 | Chang . |
| 4,937,301 | 6/1990 | Chang . |
| 5,008,228 | 4/1991 | Chang . |
| 5,017,714 | 5/1991 | Welborn, Jr. ............................ 502/117 |
| 5,086,025 | 2/1992 | Chang . |
| 5,147,949 | 9/1992 | Chang . |
| 5,238,892 | 8/1993 | Chang . |
| 5,240,894 | 8/1993 | Burkhardt et al. ...................... 502/103 |
| 5,243,001 | 9/1993 | Winter et al. ............................ 502/152 |
| 5,328,969 | 7/1994 | Winter et al. ............................ 502/155 |
| 5,329,033 | 7/1994 | Spaleck et al. ......................... 502/117 |
| 5,332,706 | 7/1994 | Nowlin et al. .......................... 502/104 |
| 5,602,067 | 2/1997 | Nowlin et al. .......................... 502/104 |
| 5,654,248 | 8/1997 | Kioka et al. ............................. 502/103 |
| 5,693,836 | 12/1997 | Winter et al. .............................. 556/11 |
| 5,721,184 | 2/1998 | Brinen et al. ............................ 502/104 |
| 5,767,032 | 6/1998 | Hokkanen et al. ...................... 502/113 |
| 5,789,332 | 8/1998 | Kutschera et al. ...................... 502/107 |

FOREIGN PATENT DOCUMENTS

| | | |
|---|---|---|
| 2099214 | 12/1993 | Canada . |
| 308177 | 7/1992 | European Pat. Off. . |
| 537686 | 4/1993 | European Pat. Off. . |
| 0 589 638 A2 | 3/1994 | European Pat. Off. . |
| 94/14855 | 4/1994 | WIPO . |
| 94/14856 | 7/1994 | WIPO . |
| WO 95/12622 | 5/1995 | WIPO . |
| WO 95/26372 | 10/1995 | WIPO . |
| WO96/14155 | 5/1996 | WIPO . |

*Primary Examiner*—Mark L. Bell
*Assistant Examiner*—J. Pasterczyk
*Attorney, Agent, or Firm*—C. Paige Schmidt; Joseph F. Reidy

[57] ABSTRACT

This invention is generally directed toward a supported catalyst system useful for polymerizing olefins. The method for supporting the catalyst system of the invention provides for a metallocene catalyst and alumoxane activator supported on a porous support using a total volume of catalyst solution that is less than that of which a slurry is formed. The metallocene and alumoxane aer mixed in solution, then the solution is added to a porous support in a volume between the total pore volume of the support and the volume at which a slurry forms. The solvent is then removed, leaving an activated supported metallocene.

26 Claims, No Drawings

POLYMERIZATION CATALYST SYSTEMS

This is a continuation of application Ser. No. 08/688,418, filed Jul. 30, 1996, now abandoned, which is a continuation of application Ser. No. 08/413,140, filed Mar. 29, 1995, abandoned which is a continuation-in-part of U.S. patent application Ser. No. 08/265,532, filed Jun. 24, 1994 abandoned.

FIELD OF THE INVENTION

This invention relates to catalyst systems and to methods for their production and use in olefin polymerization. The invention particularly relates to a process for preparing a supported catalyst system for use in the gas phase, slurry phase or liquid/solution phase with improved reactor operability.

BACKGROUND OF THE INVENTION

It is desirable in many polymerization processes, particularly a slurry phase or gas phase process, to use a supported catalyst system. Generally these catalyst systems include a metallocene and alumoxane supported on a carrier, such as silica. For example, U.S. Pat. No. 4,937,217 generally describes a mixture of trimethylaluminum and triethylaluminum added to an undehydrated silica to which a metallocene catalyst component is then added. EP-308177-B1 generally describes adding a wet monomer to a reactor containing a metallocene, trialkylaluminum and undehydrated silica. U.S. Pat. Nos. 4,912,075, 4,935,397 and 4,937, 301 generally relate to adding trimethylaluminum to an undehydrated silica and then adding a metallocene to form a dry supported catalyst system. U.S. Pat. No. 4,914,253 describes adding trimethylaluminum to undehydrated silica, adding a metallocene and then drying the resulting supported catalyst system with an amount of hydrogen to produce a polyethylene wax. U.S. Pat. Nos. 5,008,228, 5,086,025 and 5,147,949 generally describe forming a dry supported catalyst system by the addition of trimethylaluminum to a water impregnated silica to form alumoxane in situ and then adding the metallocene. U.S. Pat. Nos. 4,808, 561, 4,897,455 and 4,701,432 describe techniques to form a supported catalyst system where the inert carrier, typically silica, is calcined and contacted with a metallocene(s) and an activator/cocatalyst component. U.S. Pat. No. 5,238,892 describes forming a dry supported catalyst system by mnbdng a metallocene with an alkyl aluminum and then adding undehydrated silica. U.S. Pat. No. 5,240,894 generally pertains to forming a supported metallocene/alumoxane catalyst system by forming a metallocene/alumoxane reaction solution, adding a porous carrier, and evaporating the resulting slurry to remove residual solvent from the carrier.

While all these supported catalysts are useful, it would be desirable to have an improved metallocene catalyst system which in producing polymers does not foul the reactor. As used herein, the term "catalyst system" is equivalent to the term "catalyst composition". Particularly in a slurry or gas phase polymerization process, using these catalysts systems, there is a tendency for reactor operation problems during polymerization. During a typical gas phase polymerization process fines within the reactor often accumulate and cling or stick to the walls of a reactor. This phenomenon is often referred to as "sheeting". The accumulation of polymer particles on the reactor walls, the recycling lines and cooling system results in many problems including poor heat transfer during the polymerization process. Polymer particles that adhere to the walls of the reactor and can continue to polymerize and often fuse together and form chunks, which can be detrimental to a continuous polymerization process. Similarly, in a bulk liquid propylene polymerization process, using these catalyst systems there is a tendency for polymer particles to agglomerate and cling or stick to the walls of the reactor. This too can be detrimental to such a continuous process.

It would be highly desirable to have an improved polymerization catalyst system that in a polymerization process would significantly enhance reactor operability and provide an improved polymer product.

SUMMARY OF THE INVETION

This invention is generally directed towards a new polymerization catalyst system, to methods for its manufacture and to its use in a polymerization process.

In one embodiment an improved method is provided to produce a supported bulky ligand transition metal catalyst system by contacting a porous support with a reaction product of a metallocene catalyst component and an alumoxane in a solution, the total volume of the reaction product being less than about four times the total pore volume of the porous support, preferably less than that amount at which a slurry is formed and wherein the metallocene catalyst component is a chiral, Group 4, 5 or 6 transition metal, bridged, substituted bisindenyl.

In yet another embodiment of the invention, there is provided a process for producing polypropylene polyolefins by contacting propylene monomer, optionally with a comonomer in the presence of the catalyst system described above.

DETAILED DESCRIPTION OF THE INVETION

Introduction

This invention is generally directed toward a supported catalyst system useful for polymerizing olefins. The method for forming the catalyst system of the invention involves supporting a metallocene catalyst component or compound with an alumoxane activator or cocatalyst.

It has been discovered that catalyst systems prepared with a high molar ratio of the metal content of the alumoxane to the transition metal of the metallocene compound have high activity but also tend to foul during polymerization. By reducing the amount of alumoxane to transition metal, the fouling tendency is reduced but so is catalyst activity. It has been discovered that in forming the supported catalyst system of the invention, when the volume of the metallocene and the catalyst compound alumoxane solution is less than four times the pore volume of a porous support, preferably between less than the amount required to form a slurry and above one times the pore volume of the porous support, catalyst activity is maintained and in many instances increased while fouling is reduced and in many instances eliminated. Maldng the catalyst system of the invention this way results in a simple, commercially useful and cost effective supported catalyst system. Also, the catalyst system of this invention results in a high bulk density polymer product having improved particle morphology.

Metallocene Catalyst Component of the Invention

The metallocene components employed in the present invention comprise a Group 4, 5, or 6 transition metal, biscyclopentadienyl derivatives, preferably bis-indenyl metallocene components having the following general structure:

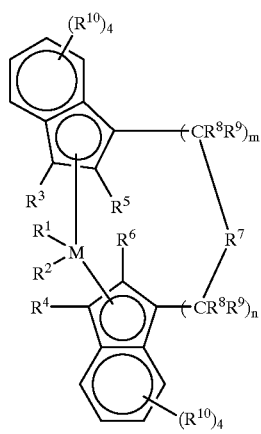

wherein $M^1$ is a metal of Group 4, 5, or 6 of the Periodic Table, for example titanium, zirconium, hafnium, vanadium niobium, tantalum, chromium, molybdenum and tungsten, preferably, zirconium, hafnium and titanium, most preferably zirconium;

$R^1$ and $R^2$ are identical or different, are one of a hydrogen atom, a $C_1$–$C_{10}$ alkyl group, preferably a $C_1$–$C_3$ alkyl group, a $C_1$–$C_{10}$ alkoxy group, preferably a $C_1$–$C_3$ alkoxy group, a $C_6$–$C_{10}$ aryl group, preferably a $C_6$–$C_8$ aryl group, a $C_6$–$C_{10}$ aryloxy group, preferably a $C_6$–$C_8$ aryloxy group, a $C_2$–$C_{10}$ alkenyl group, preferably a $C_2$–$C_4$ alkenyl group, a $C_7$–$C_{40}$ arylalkyl group, preferably a $C_7$–$C_{10}$ arylalkyl group, a $C_7$–$C_{40}$ alkylaryl group, preferably a $C_7$–$C_{12}$ alkylaryl group, a $C_8$–$C_{40}$ arylalkenyl group, preferably a $C_8$–$C_{12}$ arylalkenyl group, or a halogen atom, preferably chlorine;

$R^3$ and $R^4$ are hydrogen atoms;

$R^5$ and $R^6$ are identical or different, preferably identical, are one of a halogen atom, preferably a fluorine, chlorine or bromine atom, a $C_1$–$C_{10}$ alkyl group, preferably a $C_1$–$C_4$ alkyl group, which may be halogenated, a $C_6$–$C_{10}$ aryl group, which may be halogenated, preferably a $C_6$–$C_8$ aryl group, a $C_2$–$C_{10}$ alkenyl group, preferably a $C_2$–$C_4$ alkenyl group, a $C_7$–$C_{40}$ -arylalkyl group, preferably a $C_7$–$C_{10}$ arylalkyl group, a $C_7$–$C_{40}$ alkylaryl group, preferably a $C_7$–$C_{12}$ alkylaryl group, a $C_8$–$C_{40}$ arylalkenyl group, preferably a $C_8$–$C_{12}$ arylalkenyl group, a —$NR_2^{15}$, —$SR^{15}$, —$OR^{15}$, —$OSiR_3^{15}$ or -$PR_2^{15}$ radical, wherein $R^{15}$ is one of a halogen atom, preferably a chlorine atom, a Cl–$C_{10}$ allyl group, preferably a $C_1$–$C_3$ alkyl group, or a $C_6$–$C_{10}$ aryl group, preferably a $C_6$–$C_9$ aryl group;

$R^7$ is

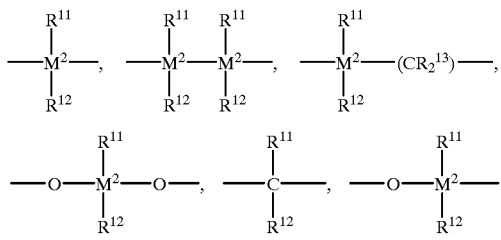

=$BR^{11}$,=$AlR^{11}$, —Ge—, —Sn—, —O—, —S—, =SO, =$SO_2$, =$NR^{11}$, =$CO,PR^{11}$, or =$P(O)R^{11}$;

wherein:

$R^{11}$, $R^{12}$ and $R^{13}$ are identical or different and are a hydrogen atom, a halogen atom, a $C_1$–$C_{20}$ alkyl group, preferably a Cl–$C_{10}$ alkyl group, a $C_1$–$C_{20}$ fluoroalkyl group, preferably a Cl–$C_{10}$ fluoroalkyl group, a $C_6$–$C_{30}$ aryl group, preferably a $C_6$–$C_{20}$ aryl group, a $C_6$–$C_{30}$ fluoroaryl group, preferably a $C_6$–$C_{20}$ fluoroaryl group, a $C_1$–$C_{20}$ alkoxy group, preferably a $C_1$–$C_{10}$ alkoxy group, a $C_2$–$C_{20}$ alkenyl group, preferably a $C_2$–$C_{10}$ alkenyl group, a $C_7$–$C_{40}$ arylalkyl group, preferably a $C_7$–$C_{20}$ arylalkyl group, a $C_8$–$C_{40}$ arylalkenyl group, preferably a $C_8$–$C_{22}$ arylalkenyl group, a $C_7$–$C_{40}$ alkylaryl group, preferably a $C_7$–$C_{20}$ alkylaryl group or $R^{11}$ and $R^{12}$, or $R^{11}$ and $R^{13}$, together with the atoms binding them, can form ring systems;

$M^2$ is silicon, germanium or tin, preferably silicon or germanium, most preferably silicon;

$R^8$ and $R^9$ are identical or different and have the meanings stated for $R^{11}$;

m and n are identical or different and are zero, 1 or 2, preferably zero or 1, m plus n being zero, 1 or 2, preferably zero or 1; and the radicals $R^{10}$ are identical or different and have the meanings stated for $R^{11}$, $R^{12}$ and $R^{13}$. Two adjacent $R^{10}$ radicals can bejoined together to form a ring system, preferably a ring system containing from about 4–6 carbon atoms.

Alkyl refers to straight or branched chain substituents. Halogen (halogenated) is fluorine, chlorine, bromine or iodine atoms, preferably fluorine or chlorine.

Particularly preferred metallocenes are compounds of the structures:

(A)

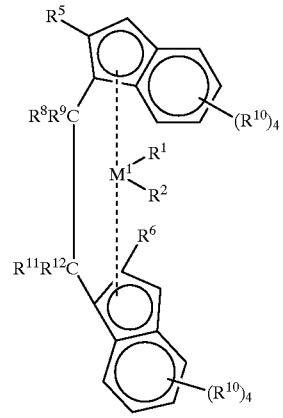

(B)

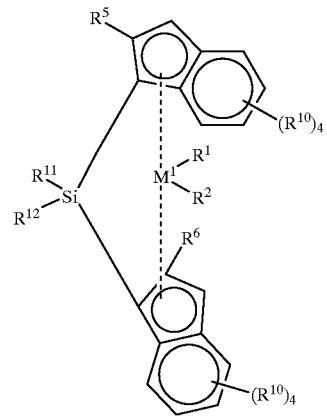

wherein:

$M^1$ is Zr or Hf, $R^1$ and $R^2$ are methyl or chlorine, and $R^5$, $R^6 R^8$, $R^9$,$R^{10}$, $R^{11}$ and $R^{12}$ have the above-mentioned meanings.

The chiral metallocenes are used as a racemate for the preparation of highly isotactic polypropylene copolymers.

It is also possible to use the pure R or S form. An optically active polymer can be prepared with these pure stereoisomeric forms. It is preferred that the meso form of the metallocenes be removed to ensure the center (i.e., the metal atom) provides stereoregular polymerization.

Separation of the stereoisomers can be accomplished by known literature techniques. For special products it is also possible to use rac/meso mixtures.

Generally, the metallocenes are prepared by a multi-step process involving repeated deprotonations/metallations of the aromatic ligands and introduction of the bridge and the central atom by their halogen derivatives. The following reaction scheme illustrates this generic approach:

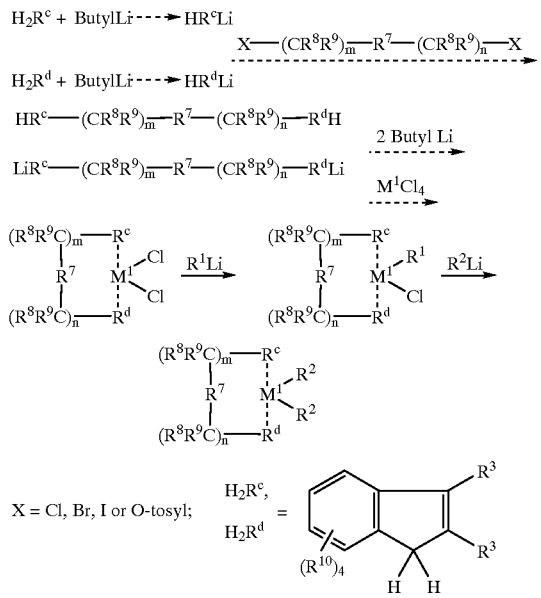

The reader is referred to the *Journal of Organometallic Chem.*, volume 288, (1958), pages 63–67, and EP-A-320762, for preparation of the metallocenes described, both references are herein fully incorporated by reference.

Illustrative but non-limiting examples of metallocenes include:
Dimethylsilandiylbis (2-methyl4-phenyl-1-indenyl)ZrCl$_2$
Dimethylsilandiylbis(2-methyl-4,5-benzoindenyl)ZrCl$_2$;
Dimethylsilandiylbis(2-methyl-4,6-diisopropylindenyl)ZrCl$_2$;
Dimethylsilandiylbis(2-ethyl4-phenyl-1-indenyl)ZrCl$_2$;
Dimethylsilandiylbis (4-naphthyl-1-indenyl)ZrCl$_2$,
Phenyl(Methyl)silandiylbis(2-methyl-4-phenyl- 1-indenyl)ZrCl$_2$,
Dimethylsilandiylbis(2-methyl4-(1-naphthyl)-1-indenyl)ZrCl$_2$,
Dimethylsilandiylbis(2-methyl4-(2-naphthyl)-1-indenyl)ZrCl$_2$,
Dimethylsilandiylbis(indenyl)ZrCl$_2$,
Dimethylsilandiylbis(2-methyl-4,5-diisopropyl-1-indenyl)ZrCl$_2$,
Dimethylsilandiylbis(2,4,6-trimethyl-1-indenyl)ZrCl$_2$,
Phenyl(Methyl)silandiylbis(2-methyl-4,6-diisopropyl-1-indenyl)ZrCl$_2$,
1,2-Ethandiylbis(2-methyl-4,6-diisopropyl-1-indenyl)ZrCl$_2$,
1,2-Butandiylbis(2-methyl-4,6-diisopropyl-1-indenyl)ZrCl$_2$,
Dimethylsilandiylbis(2-methyl-4-ethyl-1-indenyl)ZrCl$_2$,
Dimethylsilandiylbis(2-methyl4-isopropyl-1-indenyl)ZrCl$_2$,
Dimethylsilandiylbis(2-methyl4-t-butyl-1-indenyl)ZrCl$_2$,
Phenyl(Methyl)silandiylbis(2-methyl-4-isopropyl-1-indenyl)ZrCl$_2$,
Dimethylsilandiylbis(2-ethyl-4-methyl-1 -indenyl)ZrCl$_2$,
Dimethylsilandiylbis(2,4-dimethyl-1-indenyl)ZrCl$_2$,
Dimethylsilandiylbis(2-methyl-4-ethyl-1-indenyl)ZrCl$_2$,
Dimethylsilandiylbis(2-methyl-α-acenaphth-1-indenyl)ZrCl$_2$,
Phenyl(Methyl)silandiylbis(2-methyl-4,5-benzo-1-indenyl)ZrCl$_2$,
Phenyl(Methyl)silandiylbis(2-methyl4,5-(methylbenzo)-1-indenyl)ZrCl$_2$,
Phenyl(Methyl)silandiylbis(2-methyl-4,5-(tetramethylbenzo)-1-indenyl)ZrCl$_2$,
Phenyl(Methyl)silandiylbis (2-methyl-a-acenaphth-1-indenyl)ZrCl$_2$,
1,2-Ethandiylbis(2-methyl-4,5-benzo-1-indenyl)ZrCl$_2$,
1,2-Butandiylbis(2-methyl-4,5-benzo-1-indenyl)ZrCl$_2$,
Dimethylsilandiylbis(2-methyl4,5-benzo-1-indenyl)ZrCl$_2$,
1,2-Ethandiylbis(2,4,7-trimethyl-1-indenyl)ZrCl$_2$,
Dimethylsilandiylbis(2-methyl-1-indenyl)ZrCl$_2$,
1,2-Ethandiylbis(2-methyl-1-indenyl)ZrCl$_2$,
Phenyl(Methyl)silandiylbis(2-methyl-1-indenyl)ZrCl$_2$,
Diphenylsilandiylbis(2-methyl-1 -indenyl)ZrCl$_2$,
1,2-Butandiylbis(2-methyl-1-indenyl)ZrCl$_2$,
Dimethylsilandiylbis(2-ethyl-1-indenyl)ZrCl$_2$,
Dirnethylsilandiylbis(2-methyl-5-isobutyl-1-indenyl)ZrCl$_2$,
Phenyl(Methyl)silandiylbis(2-methyl-5-isobutyl-1-indenyl)ZrCl$_2$,
Dimethylsilandiylbis(2-methyl-5-t-butyl-1-indenyl)ZrCl$_2$,
Dimethylsilandiylbis(2,5,6-trimethyl-1-indenyl)ZrCl$_2$, and the like.

The metallocene catalyst components of this invention are described in detail in U.S. Pat. Nos. 5,149,819, 5,243,001, 5,239,022, 5,296,434 and 5,276,208 all of which are herein fully incorporated by reference.

Activator Component of the Invention

The activator or cocatalyst component of the present invention is alumoxane represented by the general formula:

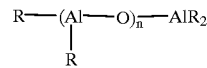

for oligomeric, linear alumoxane and

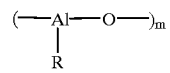

for oligomeric, cyclic alumoxane, wherein n and m=1–40, most preferably 3–20, and R is a C1–8 alkyl group or R is an C$_{6-18}$ aryl group, or hydrogen, preferably a methyl group, or R can be mixtures of alkyl and aryl substituents.

There are a variety of methods for preparing alumoxane, non-limiting examples of which are described in U.S. Pat. No. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031 and EP-A-0 561 476, EP-B1–0 279 586, EP-A-0 594–218 and WO 94/10180, all of which are fully incorporated herein by reference. It may be preferable to use a visually clear methylalumoxane. A cloudy or gelled alumoxane can be filtered to produce a clear solution or clear alumoxane can be decanted from a cloudy solution.

Support Medium of the Invention

For purposes of this patent specification the term "carrier" or "support" are interchangeable and can be any support material, preferably a porous support material, such as for example, talc, inorganic oxides, inorganic chlorides and resinous support materials such as polyolefin or polymeric compounds or any other organic support material and the like that has an average particle size greater than 10 μm.

The preferred support materials are inorganic oxide materials, which include those from the Periodic Table of Elements of Groups 2, 3, 4, 5, 13 or 14 metal oxides. In a preferred embodiment, the catalyst support material include silica, alumina, silica-alumina, and mixtures thereof Other inorganic oxides that may be employed either alone or in combination with the silica, alumina or silica-alumina are magnesia, titania, zirconia, and the like.

It is preferred that the carrier of the catalyst of this invention has a surface area in the range of from about 10 to about 700 m$^2$/g, pore volume in the range of from about 0.1 to about 4.0 cc/g and average particle size in the range of from about 10 to about 500 μm. More preferably, the surface area is in the range of from about 50 to about 500 m$^2$/g, pore volume of from about 0.5 to about 3.5 cc/g and average particle size of from about 20 to about 200 μm. Most preferably the surface area range is from about 100 to about 400 m$^2$/g, pore volume from about 0.8 to about 3.0 cc/g and average particle size is from about 30 to about 100 μm. The pore size of the carrier of the invention typically has pore size in the range of from 10 to 1000Å, preferably 50 to about 500Å, and most preferably 75 to about 350Å.

Method of Producing the Catalyst System of the Invention

The supported catalyst system of the invention can be made in a variety of different ways.

For the purposes of this patent specification and appended claims the term "solution" includes a suspension, slurry or a mixture. Any compatible solvent capable of forming a solution or the like with at least one metallocene catalyst component and/or at least one alumoxane of the invention can be used. Non-limiting examples of solvents are those aliphatic, aromatic and saturated hydrocarbons, and cyclic hydrocarbons such as isopentane, heptane, toluene and the like. The more preferred solvents are the cyclic aliphatic and aromatic hydrocarbons, the most preferred of which is toluene.

The general support technique employed involves contacting, in a suitable solvent or other liquid, a metallocene catalyst component as described above with alumoxane or methylalumoxane (MAO) to form a soluble reaction product. The soluble reaction product is then contacted with a porous carrier, wherein the total volume of the soluble reaction product added to the carrier is less than four times the pore volume of the carrier, preferably less than the volume required to form a slurry. The resulting supported catalyst system can be dried to ensure that essentially all or most of the residual solvent is removed from the pores of the carrier. A free flowing supported catalyst system is obtained.

In one embodiment, a method to produce a free flowing, optionally prepolymerized supported catalyst system is provided, the method comprising the steps of: a) forming in a suitable solvent, a metallocenelalumoxane mixture wherein the metallocene is as described above; b) contacting the mixture of (a) with a porous carrier; wherein the total volume of the mixture added to the porous carrier is in the range of from less than that volume required to form a slurry to above one times the total pore volume of the porous support; c) removing essentially all the solvent; d) obtaining a supported catalyst system; and e) optionally prepolymerizing said supported catalyst system with one or more olefinic monomer(s), to form a prepolymerized supported catalyst system for the production of polymers of propylene or copolymers thereof, having a molecular weight of about 50,000 or greater, preferably 100,000 or greater, a melting point of about 135° C. or greater, preferably about 140° C. or greater, and more preferably about 145° C. or greater and a bulk density of about 0.30 g/cm$^3$ or greater. The resulting granular polymer also has an average particle size of about 500 to about 1000 microns or greater. In the most preferred embodiment, the metallocene and the alumoxane components are combined to form a solution which is then added to a porous support.

In another embodiment, the dried supported catalyst system is washed or otherwise treated to remove weakly associated catalyst component(s). Any hydrocarbon may be used to wash the catalyst system, however, the hydrocarbon should be capable of dissolving the catalyst component and should be easy to dry from the support. Toluene and hexane are preferred.

Furthermore, in one embodiment of the invention the total volume of the metallocene/alumoxane solution is less than four times the pore volume of the porous support, more preferably less than three times, even more preferably less than two times, and most preferably less than one time the total pore volume of the porous support.

It is preferable to apply the solution containing catalyst component(s) to the support such that a homogeneous catalyst system is obtained, i.e., wherein the component(s) are evenly distributed on and within the support material particles. In a preferred embodiment, the total volume of solution containing metallocene and activator added to the support is in the range of from less than that volume at which a slurry is formed to above that volume equal to the total pore volume of the support, preferably from 2.5 times the total pore volume of the support to about 1.05 times the total pore volume of the support, more preferably from about 2.4 to about 1.1 times the total pore volume of the support, even more preferably from about 2.3 to about 1.2 times the total pore volume of the support, even more preferably from about 2.2 to about 1.25 times the total pore volume of the support, even more preferably from about 2.1 to about 1.27 times the total pore volume of the support, even more preferably from about 2.0 to about 1.3 times the total pore volume of the support, and even more preferably from about 2.0 to about 1.5 times the total pore volume of the support. Preferably, the solution is applied either dropwise or as a spray while the support is agitated or otherwise thoroughly mixed.

Generally, a slurry is formed when two phases are observable one of which contains all or most of the support material. The volume of solution required to reach this stage will vary depending upon among other things the type of support material and type of catalyst system components. Just prior to the point at which a slurry is formed, is a stage which is defined herein as the "mud" stage. At the mud stage, the solution volume is such that, while two phases are not visible, the support material is saturated and the support particles are firmly packed together. Prior to the mud stage, the volume of solution is such that the support material appearance ranges from dry and free flowing (even though the support may contain close to one pore volume of solution) to dry but slightly sticky to variously damp and clumpy such as is the appearance of variously wet sand.

In one embodiment, the volume of solution applied to the support material ranges from above one pore volume to that required to form a slurry, preferably from above one pore volume to that required to reach the mud stage. It should be recognized that catalyst systems formed in the mud stage are more difficult to mix and require longer drying times as compared to those prepared with less solution. Below one pore volume it may be difficult to obtain homogeneous coverage of the support material with the catalyst system components. This may lead to fouling.

It is contemplated by the invention that when preparing the catalyst system, the total amount of the solution is added to the porous support at one time, or, individually portions of the solution is added to the porous support such that at any point in time during the formation of the catalyst system the volume of solution is as described above.

The catalyst system of the invention can be dried and still contain an amount of solvent, for example, toluene, in its dried state; however, it is preferred that substantially all the solvent is removed. For the purposes of this patent specification and appended claims the term "substantially all of the solvent is removed" means that greater than about 90% of all the solvent is removed from the supported catalyst system when drying.

In another aspect of the invention, the ratio of the total volume of the metallocene catalyst component, alumoxane, and solvent to the total pore volume of the porous support material is in the range of 5:1 to 0.5:1, preferably 2.5:1 to 0.8:1, even more preferably 2:1 to 0.8:1, and most preferably 1:1 to 0.85:1.

The procedure for measuring the total pore volume of a porous support is well known in the art. Details of one of these procedures is discussed in Volume 1, *Experimental Methods in Catalytic Research* (Academic Press, 1968) (specifically see pages 67–96). This preferred procedure involves the use of a classical BET apparatus for nitrogen absorption. Another method well know in the art is described in Innes, *Total porosity and Particle Density of Fluid Catalysts By Liquid Titration,* Vol. 28, No. 3, Analytical Chemistry 332–334 (March, 1956).

In another embodiment of the invention, the mole ratio of the metal of the alumoxane component to the transition metal of the metallocene component is in the range of ratios between 10:1 to 800:1, preferably 20:1 to less than 500:1, and most preferably 50:1 to less than 400:1.

The supported catalyst system of the invention may include a surface modifier such as that described in U.S. Patent Application No. 08/322,675 (fully incorporated herein by reference) and/or an antistatic agent, for example, those described in U.S. Pat. No. 5,283,278, fully incorporated herein by reference. Non-limiting examples of antistatic agents include, alcohol, thiol, silanol, diol, ester, ketone, aldehyde, acid, amine, and ether compounds. Tertiary amine compounds are preferred. The antistatic agent can be added at any stage in the formation of the supported catalyst system of the invention, however, it is preferred that it is added after the supported catalyst system of the invention is formed, in either a slurry or dried state. In another embodiment of the invention, the supported catalyst system of the invention includes a polyolefin wax or tackifier or the like.

Polymerization Process of the Invention

The catalyst system of this invention is suited for the polymerization of monomers and optionally comonomers in any polymerization or prepolymerization process, gas, slurry or solution phase; even a high pressure autoclave process can be utilized. In the preferred embodiment a gas phase or slurry phase process is utilized, most preferably a bulk liquid propylene polymerization process is used.

In the preferred embodiment, this invention is directed toward the bulk liquid propylene slurry or gas phase polymerization or copolymerization reactions involving the polymerization of propylene with one or more of the alpha-olefin monomers having from 4 to 20 carbon atoms, preferably 4–12 carbon atoms, for example alpha-olefin comonomers of ethylene, butene-1, pentene-1, 4-methylpentene-1, hexene-1, octene-1, decene-1, and cyclic olefins such as styrene. Other monomers can include polar vinyl, diolefins such as dienes, norbornene, acetylene and aldehyde monomers. The invention is particularly well suited to the polymerization reactions involving the polymerization of propylene. All the processes of the invention can be prepolymerized or polymerized or used in conjunction with an additive or scavenger component to enhance catalytic activity.

Optionally, the supported catalyst system of the invention can be prepolymerized. Prepolymerization has been found to improve particle morphology.

EXAMPLES

In order to provide a better understanding of the present invention including representative advantages and limitations thereof, the following examples are offered.

In all examples the supernatant of a 30 wt % methyl alumoxane in toluene available from Albemarle Corporation, Baton Rouge, Louisiana was used. It is well known to those skilled in the art that methylalumoxane is a colloidal suspension in toluene ranging in consistency from a clear, gel free to an opaque gelled liquid, however, for the purposes of this invention gel free methylalumoxane is preferred.

Example 1

Catalyst 1

A precursor solution was prepared by combining 11.858 g of 30 wt % gel free methylaluminoxane in toluene (61.05 millimoles Al) and 0.0747 g of dimethylsilylbis(2-methylindenyl)zirconium dichloride (0.156 millimoles Zr) with stirring. The precursor solution was added to 8.433 g of silica MS948, 1.6 cc/g P.V., available from W. R. Grace, Davison Chemical Division, Baltimore, Md. (Davison Chemical Co.) previously heated to 800° C. under $N_2$. The ratio of liquid volume to total silica pore volume was 0.95. The finely divided, free-flowing solid was dried at reduced pressure (28+in. Hg vacuum) and 40° C. for 16 hours. 11.147 g catalyst was obtained. Elemental analysis showed 0.12 wt % Zr and 15.30 wt % Al.

Example 2

Catalyst 2

A precursor solution was prepared by combining 4.060 g of gel free 30 wt % methylaluminoxane in toluene (20.90 millimoles Al) and 0.0252 g of dimethylsilylbis(2-methylindenyl)zirconium dichloride (0.053 millimoles Zr) with stirring. 2.318 g of toluene was added to dilute the precursor solution. 2.868 g of silica (MS948, 1.6 cc/g P.V., Davison Chemical Co.) previously heated to 800° C. under $N_2$ was charged to a small beaker and the precursor was added all at once. The ratio of liquid volume to total silica pore volume was 1.53. A spatula was used to stir the mixture which had the appearance of wet sand. The mixture was then dried at reduced pressure (28+in. Hg vacuum) and 40° C. for 16 hours. 3.908 g of free flowing catalyst was obtained. Elemental analysis showed 0.12 wt % Zr and 14.34 wt % Al.

Example 3

Catalyst 3

A precursor solution was prepared by combining 4.268 g of gel free 30 wt % methylaluminoxane in toluene (21.97 millimoles Al) and 0.0374 g of dimethylsilylbis(2-methylindenyl)zirconium dichloride (0.078 millimoles Zr) with stirring. The precursor solution was added to 4.250 g of silica (MS948, 1.6 cc/g P.V., Davison Chemical Co.) previously heated to 800° C. under $N_2$. The ratio of liquid volume to total silica pore volume was 0.68. The finely divided, free-flowing solid was dried at reduced pressure (28+in. Hg vacuum) and 40° C. for 16 hours. 5.209 g catalyst was obtained. Elemental analysis showed 0.12 wt % Zr and 10.68 wt % Al.

Example 4

Catalyst 4

A precursor solution was prepared by combining 4.205 g of gel free 30 wt % methylaluminoxane in toluene (21.65 millimoles Al) and 0.0367 g of dimethylsilylbis(2-methylindenyl)zirconium dichloride (0.077 millimoles Zr) with stirring. The precursor solution was diluted with 1.648 g of toluene. The precursor was added to 4.125 g of silica (MS948, 1.6 cc/g P.V., Davison Chemical Co.) previously heated to 800° C. under $N_2$. The ratio of liquid volume to total silica pore volume was 0.97. The finely divided, free-flowing solid was dried at reduced pressure (28+in. Hg vacuum) and 40° C. for 16 hours. 5.032 g catalyst was obtained. Elemental analysis showed 0.12 wt % Zr and 10.96 wt % Al.

Example 5

Catalyst 5

A precursor solution was prepared by combining 3.106 g of gel free 30 wt % methylaluminoxane in toluene (15.99 millimoles Al) and 0.0401 g of dimethylsilylbis(2-methyflindenyl)zirconium dichloride (0.084 millimoles Zr) with stiring. 2.516 g of toluene was added to dilute the precursor. The precursor solution was added to 4.024 g of silica (MS948, 1.6 cc/g P.V., Davison Chemical Co.) previously heated to 800° C. under $N_2$. The ratio of liquid volume to total silica pore volume was 0.97. Drying of the finely divided, free-flowing solid was started at 25 in Hg vacuum and 35° C. Vacuum and temperature were increased to 29+in. Hg vacuum and 60° C. over 2.5 hours. Elemental analysis showed 0.13 wt % Zr and 7.93 wt % Al. Drying continued for an additional 1.0 hour. 4.862 g of free flowing catalyst was obtained.

Example 6

Catalyst 6

A precursor solution was prepared by combining 1.560 g of gel free 30 wt % methylaluminoxane in toluene (8.03 millimoles Al) and 0.0201 g of dimethylsilylbis(2-methylindenyl)zirconium dichloride (0.042 millimoles Zr) with stirring. 5.504 g of toluene was added to dilute the precursor solution. 2.005 g of silicay (MS948, 1.6 cc/g P.V., Davison Chemical Co.) previously heated to 800° C. under $N_2$ was charged to a small beaker and the precursor was added all at once. The ratio of liquid volume to total silica pore volume was 2.48. A spatula was used to stir the mixture which had the appearance of very wet sand or mud. The mixture was then dried at 25 in. Hg vacuum and 50° C. until all liquid was removed then vacuum and temperature were increased to 29+in. Hg vacuum and 60° C. over 0.75 hours. Elemental analysis showed 0.15 wt % Zr and 8.63 wt % Al.

Drying continued for an additional 1.0 hour. 2.444 g of free flowing catalyst was obtained.

Example 7

Catalyst 7

A precursor solution was prepared by combining 1.563 g of gel free 30 wt % methylaluminoxane in toluene (8.05 millimoles Al) and 0.0209 g of dimethylsilylbis(2-methylindenyl)zirconium dichloride (0.044 millimoles Zr) with stirring. 17.402 g of fresh toluene was added to dilute the precursor solution. 2.011 g of silica (MS948, 1.6 cc/g P.V., Davison Chemical Co.) previously heated to 800° C. under $N_2$ was charged to a small beaker and the precursor solution was added all at once. The ratio of liquid volume to total silica pore volume was 6.70. A spatula was used to stir the mixture and the slurry was dried at 25 in Hg vacuum and 25° C. until all liquid was removed then vacuum and temperature were increased to 28+in. Hg vacuum and 60° C. over 1.25 hours. Drying continued for an additional 1.0 hour at 28+in. Hg and 60° C. for 1.0 hour. 2.395 g of free flowing catalyst was obtained.

Comparative Example 8

Catalyst 8

A precursor solution was prepared by combining 6.932 g of gel free 30 wt % methylaluminoxane in toluene (35.68 millimoles Al) and 0.0227 g of dimethylsilylbis(2-methylindenyl)zirconium dichloride (0.048 millimoles Zr) with stirring. 12.384 g of toluene was added to dilute the precursor solution. 2.007 g of silica (MS948, 1.6 cc/g P.V., Davison Chemical Co.) previously heated to 800° C under $N_2$ was slowly added to the precursor solution. The ratio of liquid volume to total silica pore volume was 6.70. The slurry was dried at 25 in Hg vacuum and 50° C. until all liquid was removed then vacuum and temperature were increased to 28+in. Hg vacuum and 60° C. over 1.5 hours. Drying continued for an additional 1.0 hour at 28+in. Hg and 60° C.for 1.0 hour. 4.100 g of free flowing catalyst was obtained. Elemental analysis showed 0.091 wt % Zr and 20.48 wt % Al.

Example 9

Catalyst 9

A precursor solution was prepared by combining 5.809 g of 30 wt % methylaluminoxane in toluene (29.91 millimoles Al) and 0.0365 g of dimethylsilylbis(2-methylindenyl)zirconium dichloride (0.076 millimoles Zr) with stirring. The precursor solution was added to 4.225 g of silica (MS948FF, 1.6 cc/g P.V., Davison Chemical Co.) previously heated to 200° C. under $N_2$. The ratio of liquid volume to total silica pore volume was 0.93. The finely divided, free-flowing solid was dried under vacuum at 28+in. Hg and at 40° C. for 16 hours. 4.909 g catalyst was obtained. Elemental analysis showed 0.12 wt % Zr and 15.98 wt % Al.

Example 10

Catalyst 10

A precursor solution was prepared by combining 5.692 g of 30 wt % methylaluminoxane in toluene (29.31 millimoles Al) and 0.0358 g of dimethylsilylbis(2-methylindenyl) zirconium dichloride (0.075 millimoles Zr) with stirring. Using the apparatus of Method 3, the precursor was added to 4.140 g of silica (MS948FF, 1.6 cclg P.V., Davison Chemical Co.) previously heated to 600° C under $N_2$. The ratio of liquid volume to total silica pore volume was 0.93. The finely divided, free-flowing solid was dried under vacuum at 22 in. Hg and 30° C. for 1.5 hours then at 28+in. Hg and 60° C. for 2 hours. 5.344 g catalyst was obtained. Elemental analysis showed 0.10 wt % Zr and 15.58 wt % Al.

Examples 9 and 10 are illustrative of the catalyst of the invention and show that the silica dehydration temperature is not critical.

Example 11

Catalyst 11

A precursor solution was prepared by combining 4.339 g of 30 wt % methylaluminoxane in toluene (22.34 millimoles Al) and 0.0273 g of dimethylsilylbis(2-methylindenyl) zirconium dichloride (0.057 millimoles Zr) with stirring. The precursor solution was added to 3.079 g of silica (MS3040, 3.0 cc/g P.V., Philadelphia Quartz) previously heated to 700° C. in air then 50° C. in vacuo with $N_2$ purge. The ratio of liquid volume to total silica pore volume was 0.51. The finely divided, free-flowing solid was dried at reduced pressure under vacuum at 28+in. Hg and at 40° C. for 16 hours. 4.054 g catalyst was obtained. Elemental analysis showed 0.10 wt % Zr and 13.92 wt % Al. This example illustrates formation of the catalyst system of the invention with a different porosity carrier.

POLYMERIZATION TESTS FOR CATALYSTS 1–11

A sample of each of the supported catalyst made in the above Examples 1–11 was slurried in 2 ml of hexane and flushed with 250 mls of propylene into a 2 liter autoclave reactor, previously flushed with nitrogen, and containing triethylaluminum (0.5 ml of a 1M solution in hexane) and 1000 ml of propylene, then the reactor is heated to a temperature of 65° C. The reaction was run for 1 hour, at which time, the reactor was cooled, vented, and purged with nitrogen for 20 minutes. After the nitrogen purge, the reactor was opened, and the product was collected and dried in vacuo for a minimum of 2 hours at 75° C. If there was any residual product (fouling) on the agitator or thermocouple, it was collected and weighed separately.

TABLE 1

| Cata-lyst | Metals* Loading | | Mole Ratio | Percent-age Pore | g Polymer/ | g Polymer/ | Percent Fouling |
| --- | --- | --- | --- | --- | --- | --- | --- |
| | Al | Zr | Al/Zr | Volume | g Catalyst | mg Zr | ** |
| 1 | 7.24 | 0.019 | 381 | 95 | 2420 | 2017 | ~0.5 |
| 2 | 7.29 | 0.018 | 405 | 153 | 2767 | 2306 | ~0.5 |
| 3 | 5.17 | 0.018 | 287 | 68 | 2710 | 2258 | ~0.2 |
| 4 | 5.25 | 0.019 | 276 | 97 | 2865 | 2388 | 0.2 |
| 5 | 3.97 | 0.021 | 189 | 97 | 2642 | — | 0 |
| 6 | 4.00 | 0.021 | 190 | 250 | 2554 | — | 0 |
| 7 | 4.02 | 0.021 | 191 | 670 | 1876 | — | 0 |
| C-8 | 17.78 | 0.024 | 740 | 670 | 2320 | 2549 | 11.8 |
| 9 | 7.08 | 0.021 | 337 | 93 | 2417 | 2014 | <0.1 |
| 10 | 7.08 | 0.018 | 393 | 93 | 2292 | 2292 | 0 |
| 11 | 7.26 | 0.019 | 382 | 51 | 2182 | 2182 | <0.1 |

*millimoles per gram Silica
**grams fouled polymer per total polymer obtained times 100%

Example 12

Catalyst 12

A precursor solution was prepared by combining 3.5022 g of 30 wt % gel free methylaluminoxane in toluene (18.03 millimoles Al) and 0.0654 g of dimethylsilylbis(2-methyl-4-phenyl-indenyl)zirconium dichloride (0.104 millimoles Zr) with stirring. Then 1.9488 g of toluene was added. The precursor solution was added to 4.00 g of silica MS948, 1.6 cc/g P.V., available from W. R. Grace, Davison Chemical Division, Baltimore, Md. (Davison Chemical Co.) previously heated to 600° C. under $N_2$. The ratio of liquid volume to total silica pore volume was 0.95. The finely divided, free-flowing solid was dried at reduced pressure (29+in. Hg vacuum) and a temperature as high as 50° C. over 2.5 hours. 5.12 g catalyst was obtained. Elemental analysis showed 0.07 wt % Zr and 8.98 wt % Al.

Example 13

Catalyst 13

A precursor solution was prepared by combining 3.4997 g of 30 wt % gel free methylaluminoxane in toluene (18.02 millimoles Al) and 0.0648 g of dimethylsilylbis(2-methyl4-phenyl-indenyl)zirconium dichloride (0.103 millimoles Zr) with stirring. Then 3.6798 g of toluene was added. The precursor solution was added to 4.00 g of silica MS948, 1.6 cc/g P.V., available from W. R. Grace, Davison Chemical Division, Baltimore, Md. (Davison Chemical Co.) previously heated to 600° C. under $N_2$. The ratio of liquid volume to total silica pore volume was 1.25. The solid had the consistency of damp sand and was dried at reduced pressure (29+in. Hg vacuum) and a temperature as high as 50° C. over 2.5 hours. 4.99 g finely divided, free-flowing solid catalyst was obtained. Elemental analysis showed 0.07 wt % Zr and 8.64 wt % Al.

Example 14

Catalyst 14

A precursor solution was prepared by combining 3.5017 g of 30 wt % gel free methylaluminoxane in toluene (18.03 millimoles Al) and 0.0653 g of dimethylsilylbis(2-methyl-4-phenyl-indenyl)zirconium dichloride (0.104 millimoles Zr) with stirring. Then 9.3018 g oftoluene was added. The precursor solution was added to 4.00 g of silica MS948, 1.6 cc/g P.V., available from W. R. Grace, Davison Chemical Division, Baltimore, Md. (Davison Chemical Co.) previously heated to 600° C. under $N_2$. The ratio of liquid volume to total silica pore volume was 2.25. The solid had the consistency of wet sand and was dried at reduced pressure (29+in. Hg vacuum) and a temperature as high as 50° C. over 2.5 hours. 5.11 g catalyst finely divided, free-flowing solid was obtained. Elemental analysis showed 0.10 wt % Zr and 9.21 wt % Al.

Example 15

Catalyst 15

A precursor solution was prepared by combining 5.0489 g of 30 wt % gel free methylaluminoxane in toluene (25.992 millimoles Al) and 0.0649 g of dimethylsilylbis(2-methyl4-phenyl-indenyl)zirconium dichloride (0.103 millimoles Zr) with stirring. Then 0.5014 g of toluene was added. The precursor solution was added to 4.00 g of silica MS948, 1.6 cc/g P.V., available from W. R. Grace, Davison Chemical Division, Baltimore, Md. (Davison Chemical Co.) previously heated to 600° C. under $N_2$. The ratio of liquid volume to total silica pore volume was 0.95. The finely divided, free-flowing solid was dried at reduced pressure (29+in. Hg vacuum) and a temperature as high as 50° C. over 2.5 hours. 5.65 g catalyst was obtained. Elemental analysis showed 0.098 wt % Zr and 13.17 wt % Al.

Example 16

Catalyst 16

A precursor solution was prepared by combining 5.0476 g of 30 wt % gel free methylaluminoxane in toluene (25.986 millimoles Al) and 0.0652 g of dimethylsilylbis(2-methyl4-phenyl-indenyl)zirconium dichloride (0.104 millimoles Zr) with stirring. Then 2.1983 g of toluene was added. The precursor solution was added to 4.00 g of silica MS948, 1.6 cc/g P.V., available from W. R. Grace, Davison Chemical Division, Baltimore, Md. (Davison Chemical Co.) previously heated to 600° C. under $N_2$. The ratio of liquid volume to total silica pore volume was 1.25. The solid had a consistency of damp sand and was dried at reduced pressure (29+in. Hg vacuum) and a temperature as high as 50° C. over 2.6 hours. 5.60 g finely divided, free-flowing solid catalyst was obtained. Elemental analysis showed 0.089 wt % Zr and 13.43 wt % Al.

Example 17

Catalyst 17

A precursor solution was prepared by combining 5.0552 g of 30 wt % gel free methylaluminoxane in toluene (26.025 millimoles Al) and 0.0654 g of dimethylsilylbis(2-methyl-4-phenyl-indenyl)zirconium dichloride (0.104 millimoles Zr) with stirring. Then 7.8602 g of toluene was added. The precursor solution was added to 4.00 g of silica MS948, 1.6 cc/g P.V., available from W. R. Grace, Davison Chemical Division, Baltimore, Md. (Davison Chemical Co.) previously heated to 600° C. under $N_2$. The ratio of liquid volume to total silica pore volume was 2.25. The solid had the consistency of wet sand and was dried at reduced pressure (29+in. Hg vacuum) and a temperature as high as 50° C. over 2.3 hours. 5.54 g finely divided, free-flowing solid catalyst was obtained. Elemental analysis showed 0.088 wt % Zr and 13.59 wt % Al.

Example 18

Catalyst 18

A precursor solution was prepared by combining 13.3840 g of 30 wt % gel free methylaluminoxane in toluene (68.90 millimoles Al) and 0.1014 g of dimethylsilylbis(2-methyl-4,5-benzoindenyl)zirconium dichloride (0.176 millimoles Zr) with stirring. Then 1.4120 g of toluene was added. The precursor solution was added to 9.4953 g of silica MS948, 1.6 cc/g P.V., available from W. R. Grace, Davison Chemical Division, Baltimore, Md. (Davison Chemical Co.) previously heated to 800° C. under $N_2$. The ratio of liquid volume to total silica pore volume was 0.97. The finely divided, free-flowing solid was dried at reduced pressure (28 in. Hg vacuum) and a temperature as high as 40° C. overnight. 13.183 g catalyst was obtained. Elemental analysis showed 0.09 wt % Zr and 13.25 wt % Al.

Example 19

Catalyst 19

A precursor solution was prepared by combining 4.2500 g of 30 wt % gel free methylaluminoxane in toluene (21.88 millimoles Al) and 0.0432 g of dinethylsilylbis(2-methyl-4,5-benzoindenyl)zirconium dichloride (0.075 milimoles Zr) with stirring. Then 1.4120 g of toluene was added. The precursor solution was added to 4.005 g of silica MS948, 1.6 cc/g P.V., available from W. R. Grace, Davison Chemical Division, Baltimore, Md. (Davison Chemical Co.) previously heated to 800° C. under $N_2$. The ratio of liquid volume to total silica pore volume was 0.97. The finely divided, free-flowing solid was dried at reduced pressure (29+in. Hg vacuum) and a temperature as high as 60° C. over 2.5 hours. 5.185 g catalyst was obtained. Elemental analysis showed 0.10 wt % Zr and 10.64 wt % Al.

Example 20

Catalyst 20

A precursor solution was prepared by combining 3.5902 g of 30 wt % gel free methylaluminoxane in toluene (18.48 millimoles Al) and 0.0262 g of dimethylsilylbis(2-methyl-4,5-benzoindenyl)zirconium dichloride (0.045 millimoles Zr) with stirring. Then 1.8979 g of toluene was added. The precursor solution was added to 4.0055 g of silica MS948, 1.6 cc/g P.V., available from W. R. Grace, Davison Chemical Division, Baltimore, Md. (Davison Chemical Co.) previously heated to 800° C. under $N_2$. The ratio of liquid volume to total silica pore volume was 0.94. The finely divided, free-flowing solid was dried at reduced pressure (29+in. Hg vacuum) and a temperature as high as 60° C. over 2.5 hours. 4.901 g catalyst was obtained. Elemental analysis showed 0.06 wt % Zr and 8.22 wt % Al.

Example 21

Catalyst 21

A precursor solution was prepared by combining 1.7072 g of 30 wt % gel free methylaluminoxane in toluene (8.79 millimoles Al) and 0.0257 g of dimethylsilylbis(2-methyl-4,5-benzoindenyl)zirconium dichloride (0.045 millimoles Zr) with stirring. Then 3.5518 g of toluene was added. The precursor solution was added to 3:9309 g of silica MS948, 1.6 cc/g P.V., available from W. R. Grace, Davison Chemical Division, Baltimore, Md. (Davison Chemical Co.) previously heated to 800° C. under $N_2$. The ratio of liquid volume to total silica pore volume was 0.94. The finely divided, free-flowing solid was dried at reduced pressure (29+in. Hg vacuum) and a temperature as high as 60° C. over 3.2 hours. 4.400 g catalyst was obtained. Elemental analysis showed 0.07 wt % Zr and 4.76 wt % Al.

Example 22

Catalyst 22

A precursor solution was prepared by combining 106 g of 30 wt % gel free methylaluminoxane in toluene (546 millimoles Al) and 1.10 g of dimethylsilylbis(2-methyl-4,5-benzoindenyl)zirconium dichloride (1.90 millimoles Zr) with stirring. Then 40 g of toluene was added. The precursor solution was added to 100 g of silica MS948, 1.6 cc/g P.V., available from W. R. Grace, Davison Chemical Division, Baltimore, Md. (Davison Chemical Co.) previously heated to 800° C. under $N_2$. The ratio of liquid volume to total silica pore volume was 1.0. The solid which was not totally free flowing was dried at reduced pressure (29+in. Hg vacuum) and a temperature as high as 60° C. over 3.25 hours. A finely divided, free-flowing solid catalyst was obtained. Elemental analysis showed 0.11 wt % Zr and 8.96 wt % Al.

Example 23

Catalyst 23

A precursor solution was prepared by combining 108 g of 30 wt % gel free methylaluminoxane in toluene (554 millimoles Al) and 1.10 g of dimethylsilylbis(2-methyl-4,5-benzoindenyl)zirconium dichcloride (1.90 millimoles Zr) with stirring. Then 72 g of toluene was added. The precursor solution was added to 100 g of silica MS948, 1.6 cc/g P.V., available from W. R. Grace, Davison Chemical Division, Baltimore, Md. (Davison Chemical Co.) previously heated to 800° C. under $N_2$. The ratio of liquid volume to total silica pore volume was 1.25. The solid had a consistency of damp sand and was dried at reduced pressure (29+in. Hg vacuum) and a temperature as high as 60° C. over 3.25 hours. A finely divided, free-flowing solid catalyst was obtained. Elemental analysis showed 0.12 wt % Zr and 9.26 wt % Al.

Example 24

Catalyst 24

A precursor solution was prepared by combining 1.7940 g of 30 wt % gel free methylaluminoxane in toluene (9.236 millimoles Al) and 0.0135 g of dimethylsilylbis(2-methyl-4,5-benzoindenyl)zirconium dichloride (0.023 millimoles Zr) with stirring. Then 5.3578 g of toluene was added. The precursor solution was added to 2.0153 g of silica MS948, 1.6 cc/g P.V., available from W. R. Grace, Davison Chemical Division, Baltimore, Md. Davison Chemical Co.) previously heated to 800° C. under $N_2$. The ratio of liquid volume to total silica pore volume was 2.5. The solid had the consistency of wet sand and was dried at reduced pressure (29+in. Hg vacuum) and a temperature as high as 60° C. over 3 hours. 2.6172 g catalyst finely divided, free-flowing solid was obtained. Elemental analysis showed 0.11 wt % Zr and 8.82 wt % Al.

Example 25

Catalyst 25

A precursor solution was prepared by combining 0.8765 g of 30 wt % gel free methylaluminoxane in toluene (4.508 millimoles Al) and 0.0146 g of dimethylsilylbis(2-methyl4,5-benzoindenyl)zirconium dichloride (0.025 millimoles Zr) with stiring. Then 6.2009 g of toluene was added. The precursor solution was added to 2.0015 g of silica MS948, 1.6 cc/g P.V., available from W. R. Grace, Davison Chemical Division, Baltimore, Md. (Davison Chemical Co.) previously heated to 800° C. under $N_2$. The ratio of liquid volume to total silica pore volume was 2.5. The solid had the consistency of wet sand and was dried at reduced pressure (29+in. Hg vacuum) and a temperature as high as 60° C. over 3 hours. 2.4446 g catalyst finely divided, free-flowing solid was obtained. Elemental analysis showed 0.09 wt % Zr and 5.11 wt % Al.

Comparative Example 26

Comparative Catalyst 26

A precursor solution was prepared by combining 6.8627 g of 30 wt % gel free methylaluminoxane in toluene (35.33 millimoles Al) and 0.0277 g of dimethylsilylbis(2-methyl4,5-benzoindenyl)zirconium dichloride (0.048 millimoles Zr) with stirring. Then 12.3745 g of toluene was added. The precursor solution was added to 2.0021 g of silica MS948, 1.6 cc/g P.V., available from W. R. Grace, Davison Chemical Division, Baltimore, Md. (Davison Chemical Co.) previously heated to 800° C. under $N_2$. The ratio of liquid volume to total silica pore volume was 6.7 and produced a slurry which was dried at reduced pressure (29+in. Hg vacuum) and a temperature as high as 60° C. over 4.1 hours. 4.1414 g catalyst finely divided, free-flowing solid was obtained. Elemental analysis showed 0.09 wt % Zr and 18.82 wt % Al.

POLYMERIZATION TESTS FOR CATALYSTS 12 through 17

A sample of each of the supported catalyst (75 mg) made in the above Examples 12–17 was slurried in 2 ml of hexane and flushed with 250 mls of propylene into a 2 liter autoclave reactor, previously flushed with nitrogen, and containing triethylaluminum (0.5 ml of a 1M solution in hexane) and 1000 ml of propylene at a temperature of 70° C. The reaction was run for 1 hour, at which time, the reactor was cooled, vented, and purged with nitrogen for 20 minutes. After the nitrogen purge, the reactor was opened, and the product was collected and dried in vacuo for a minimum of 2 hours at 75° C.

TABLE 2

| Catalyst | Metals* Loading Al | Metals* Loading Zr | Mole Ratio Al/Zr | Percentage Pore Volume | g Polymer/ g Catalyst | g Polymer/ mg Zr | Percent Fouling ** |
|---|---|---|---|---|---|---|---|
| 12 | 4.50 | 0.026 | 175 | 95 | 2387 | 3410 | 0.2 |
| 13 | " | " | " | 125 | 2253 | 3219 | 0 |
| 14 | " | " | " | 225 | 893 | 893 | small chunks |
| 15 | 6.50 | " | 250 | 95 | 2813 | 2870 | 2.0 |
| 16 | " | " | " | 125 | 2613 | 2936 | 0.2 |
| 17 | " | " | " | 225 | 2097 | 2383 | small chunks |

*millimoles per gram silica
**grams fouled polymer per total polymer obtained times 100%

POLYMERIZATION TESTS FOR CATALYSTS 18 through C-26

A sample of each of the supported catalyst made in the above Examples 18-C26 was slurried in 2 ml of hexane and flushed with 250 mls of propylene into a 2 liter autoclave reactor, previously flushed with nitrogen, and containing triethylaluminum (0.5 ml of a 1M solution in hexane) and 1000 ml of propylene, then the reactor is heated to a temperature of 65° C. The reaction was run for 1 hour, at which time, the reactor was cooled, vented, and purged with nitrogen for 20 minutes. After the nitrogen purge, the reactor was opened, and the product was collected and dried in vacuo for a minimum of 2 hours at 75° C. If there was any residual product (fouling) on the agitator or thermocouple, it was collected and weighed separately.

TABLE 3

| Catalyst | Metals* Loading Al | Metals* Loading Zr | Mole Ratio Al/Zr | Percentage Pore Volume | g Polymer/ g Catalyst | g Polymer/ mg Zr | Percent Fouling ** |
|---|---|---|---|---|---|---|---|
| 18 | 7.26 | 0.018 | 392 | 95 | 1571 | 1746 | ~5 |
| 19 | 5.46 | 0.019 | 293 | 97 | 2505 | 2087 | 0.5 |
| 20 | 4.61 | 0.011 | 407 | 94 | 1000 | 1099 | 0.5 |
| 21 | 2.24 | 0.011 | 197 | 94 | 595 | 495 | 0 |
| 22 | 5.50 | 0.019 | 286 | 100 | 1841 | 1674 | 0.1 |
| 23 | 5.50 | 0.019 | 291 | 125 | 796 | 796 | 0.1 |
| 24 | 4.58 | 0.012 | 395 | 250 | 562 | 562 | 0 |
| 25 | 2.25 | 0.013 | 178 | 250 | 425 | 472 | 0.1 |
| C-26 | 17.65 | 0.024 | 737 | 670 | 2068 | 2783 | 100 |

*millimoles per gram silica
**grams fouled polymer per total polymer obtained times 100%

While the present invention has been described and illustrated by reference to particular embodiments, it will be appreciated by those of ordinary skill in the art that the inventions lends itself to variations not necessarily illustrated herein. For example, it is within the scope of this invention to mix at least two of the catalysts of the invention or to use the catalyst of the invention with any other catalyst or catalyst system known in the art, for example a traditional Ziegler-Natta catalyst or catalyst system. Also the catalyst system of the invention can be used in a single reactor or in a series reactor. For this reason, then, reference should be made soley to the appended claims for purposes of determining the true scope of the present invention.

We claim:
1. A method for producing a supported catalyst composition, said catalyst composition comprising a metallocene catalyst component, an alumoxane and a porous support, said method comprising the steps of:
   a) mixing said metallocene catalyst component and said alumoxane in a solvent to form a solution wherein the metallocene catalyst component is represented by the following formula:

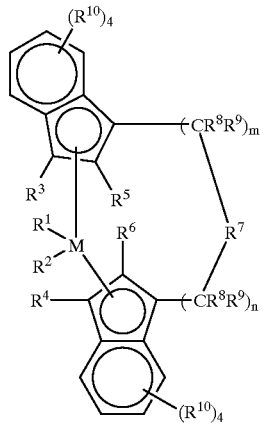

wherein
   M is a metal of group 4, 5, or 6 of the Periodic Table,
   $R^1$ and $R^2$ are identical or different and are one of a hydrogen atom, a $C_1$–$C_{10}$ alkyl group, a $C_1$–$C_{10}$ alkoxy group, a $C_6$–$C_{10}$ aryl group, a $C_6$–$C_{10}$ aryloxy group, a $C_2$–$C_{10}$ alkenyl group, a $C_7$–$C_{40}$ arylalkyl group, a $C_7$–$C_{40}$ allylaryl group, a $C_8$–$C_{40}$ arylalkenyl group, or a halogen atom;
   $R^3$ and $R^4$ are hydrogen atoms;
   $R^5$ and $R^6$ are identical or different and are one of a halogen atom, a $C_1$–$C_{10}$ alkyl group which may be halogenated, a $C_6$–$C_{10}$ aryl group which may be halogenated, a $C_2$–$C_{10}$ alkenyl group, a $C_7$–$C_{40}$ arylalkyl group, a $C_7$–$C_{40}$ allylaryl group, a $C_8$–$C_{40}$ arylalkenyl group, a —$NR^{15}_2$, —$SR^{15}$, —$OR^{15}$, —$OSiR^{15}_3$, or —$PR^{15}_2$ radical, wherein $R^{15}$ is one of a halogen atom, a $C_1$–$C_{10}$ alkyl group, or a $C_6$–$C_{10}$ aryl group;
   $R^7$ is

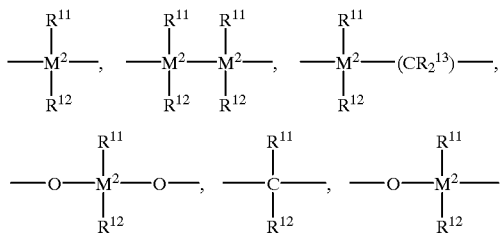

=$BR^{11}$, =$AlR^{11}$, —Ge—, —Sn—, —O—, —S—, =SO, =$SO_2$, =$NR^{11}$, =CO, =$PR^{11}$, or =$P(O)R^{11}$;
wherein:
   $R^{11}$, $R^{12}$ and $R^{13}$ are identical or different and are a hydrogen atom, a halogen atom, a $C_1$–$C_{20}$ alkyl group, a $C_1$–$C_{20}$ fluoroalkyl group, a $C_6$–$C_{30}$ aryl group, a $C_6$–$C_{30}$ fluoroaryl group, a $C_1$–$C_{20}$ alkoxy group, a $C_2$–$C_{20}$ alkenyl group, a $C_7$–$C_{40}$ arylalkyl group, a $C_8$–$C_{40}$ arylalkenyl group, $C_7$–$C_{40}$ alkylaryl group, or $R^{11}$ and $R^{12}$, or $R^{11}$ and $R^{13}$, together with the atoms directly bonded to them, form a ring system;
   $M^2$ is silicon, germanium or tin;
   $R^8$ and $R^9$ are identical or different and have the meanings as stated for $R^{11}$;
   m and n are identical or different and are zero, 1 or 2, m plus n being zero, 1 or 2; and
   the radicals $R^{10}$ are identical or different and have the meanings stated for $R^{11}$, $R^{12}$ and $R^{13}$ wherein further two adjacent $R^{10}$ radicals can be joined together to form a ring system; and
   b) combining the solution and the porous support, wherein the total volume of the solution is in the range of from above 1 time the total pore volume of the porous support to less than that volume at which a slurry is formed.

2. The method of claim 1 wherein the total volume of the solution is in the range of from less than three times the total pore volume of the porous support to above 1 times the total pore volume of the porous support.

3. The method of claim 1 wherein the total volume of the solution is in the range of from less than two times the total pore volume of the porous support to above one times the total pore volume of the porous support.

4. The method of claim 1 wherein the total volume of the solution is in the range of from less than that volume required to form a slurry to 1.05 times the total pore volume of the porous support.

5. The method of claim 1 wherein the total volume of the metallocene and the alumoxane solution is in the range of from that volume required to form a mud to 1.25 times the total pore volume of the porous support.

6. The method of claim 1 wherein the metallocene catalyst component comprises two or more metallocene catalyst components.

7. The method of claim 1 wherein the mole ratio of aluminum of the alumoxane to the transition metal of the metallocene catalyst component is in the range of from 20:1 u to but excluding 500:1.

8. The method of claim 1 wherein the method further comprises the step of prepolymerizing the supported catalyst composition with an olefinic monomer.

9. The method of claim 1 wherein m=n=0 and $M^2$=silicon.

10. The method of claim 1 wherein $R^5$=$R^6$=$C_{1\text{-}10}$ alkyl.

11. The method of claim 1 wherein with respect to at least one group three of the $R^{10}$ radicals are hydrogen and the fourth is a $C_{6\text{-}30}$ aryl group.

12. The method of claim 1 wherein with respect to at least one group two adjacent $R^{10}$ radicals form a fused 4,5-benzo ring and the other two $R^{10}$ radicals are hydrogen.

13. The method of claim 1 wherein at least one of the $R^{10}$ radicals in at least one group is a $C_{1\text{-}10}$ alkyl.

14. The method of claim 1 wherein the metallocene component is selected from the group consisting of:
   rac-dimethylsilandiylbis(2-methyl-4,5-benzoindenyl) zirconium dichloride;
   rac-dimethylsilandiylbis(2-methylindenyl)zirconium dichloride;
   rac-dimethylsilandiylbis(2-methyl-4,6-diisopropylindenyl)zirconium dichloride;
   rac-dimethylsilandiylbis(2-methyl-4-phenylindenyl) zirconium dichloride; and
   rac-dimethylsilandiylbis(2-ethyl-4-phenylindenyl) zirconium dichloride.

15. The method of claim 1 wherein the method further comprises the step of drying the supported catalyst composition.

16. A method for producing a supported catalyst composition, said catalyst composition comprising a first component comprising a chiral, Group 4 transition metal, bridged, substituted bisindenyl metallocene component and a solvent, a second component comprising an alumoxane and a solvent, and a porous support, said method comprising the steps of:
   a) combining the first component and the second component to form a reaction product;
   b) combining the reaction product and the porous support in one or more steps, such that in each step the total volume of the reaction product added to the porous support is in the range of from above one times the total pore volume of the porous support to less than that volume required to form a slurry.

17. The method of claim 16 wherein the total volume of the solution is in the range of from above one times the total pore volume of the porous support to from less than two times the total pore volume of the porous support.

18. The method of claim 16 wherein the total volume of the reaction product is in the range of from less than that volume required to form a slurry to 1.05 times the total pore volume of the porous support.

19. The method of claim 16 wherein the mole ration of the aluminum of the alumoxane to the transition metal of the metallocene is in the range of 20:1 to 500:1.

20. The method of claim 16 wherein the metallocene of the first component is represented by the general formula:

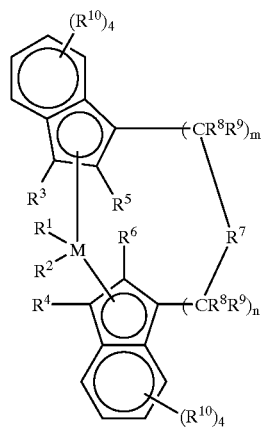

wherein:
   M is a metal of group 4 of the Periodic Table,
   $R^1$ and $R^2$ are identical or different and are one of a hydrogen atom, a $C_1$–$C_{10}$ allyl group, a $C_1$–$C_{10}$ alkoxy group, a $C_6$–$C_{10}$ aryl group, a $C_6$–$C_{10}$ aryloxy group, a $C_2$–$C_{10}$ alkenyl group, a $C_7$–$C_{40}$ arylalcyl group, a $C_7$–$C_{40}$ alkylaryl group, a C8–C40 arylalkenyl group, or a halogen atom;
   $R^3$ and $R^4$ are hydrogen atoms;
   $R^5$ and $R^6$ are identical or different and are one of a halogen atom, a $C_1$–$C_{10}$ alkyl group, which may be halogenated, a $C_6$–$C_{10}$ aryl group which may be halogenated, a $C_2$–$C_{10}$ alkenyl group, a $C_7$–$C_{40}$ arylalkyl group, a $C_7$–$C_{40}$ allaryl group, a $C_8$–$C_{40}$ arylalkenyl group, a —$NR^{15}_2$, —$SR^{15}$, —$OR^{15}$, —$OSiR^{15}_3$, or —$PR^{15}_2$ radical, wherein $R^{15}$ is one of a halogen atom, a $C_1$–$C_{10}$ arylalkenyl group, or a $C_6$–$C_{10}$ aryl group;
   $R^7$ is

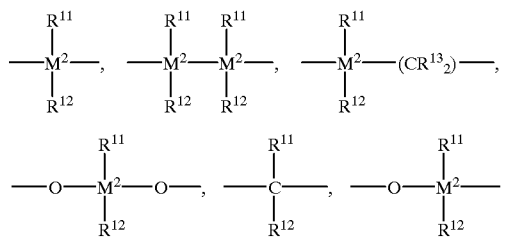

=$BR^{11}$, =$AlR^{11}$, —Ge—, —Sn—, —O—, —S—, =SO, =$SO_2$, =$NR^{11}$, =CO, =$PR^{11}$, or =$P(O)R^{11}$;
wherein:
   $R^{11}$, $R^{12}$ and $R^{13}$ are identical or different and are a hydrogen atom, a halogen atom, a $C_1$–$C_{20}$ allyl group, a $C_1$–$C_{20}$ fluoroalkyl group, a $C_6$–$C_{30}$ aryl group, a $C_6$–$C_{30}$ fluoroaryl group, a $C_1$–$C_{20}$ alkoxy group, a $C_2$–$C_{20}$ alkenyl group, a $C_7$–$C_{40}$ arylalkyl group, a $C_8$–$C_{40}$ arylalkenyl group, $C_7$–$C_{40}$ alkylaryl group, or $R^{11}$ and $R^{12}$, or $R^{11}$ and $R^{13}$, together with the atoms directly bonded to them, form a ring system;
   $M^2$ is silicon, germanium or tin;
   $R^8$ and $R^9$ are identical or different and have the meanings as stated for $R^{11}$;
   m and n are identical or different and are zero, 1 or 2, m plus n being zero, 1 or 2; and
   the radicals $R^{10}$ are identical or different and have the meanings stated for $R^{11}$, $R^{12}$ and $R^{13}$ wherein further two adjacent $R^{10}$ radicals can be joined together to form a ring system.

21. The method of claim 20 wherein the method further comprises the step of drying the supported catalyst composition such that essentially all solvent is removed from the pores of the support.

22. A method for producing a supported catalyst composition, the method comprising the steps of:
   a) forming in a suitable solvent, a metallocene/alumoxane mixture wherein the metallocene is represented by the formula:

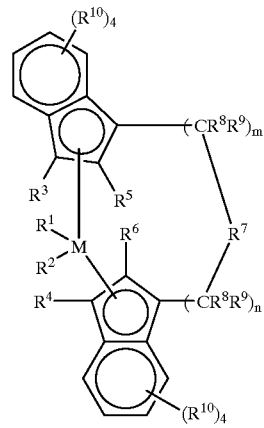

wherein:
   M is a metal of group 4, 5, or 6 of the Periodic Table,
   $R^1$ and $R^2$ are identical or different and are one of a hydrogen atom, a $C_1$–$C_{10}$ alkyl group, a $C_1$–$C_{10}$ alkoxy group, a $C_6$–$C_{10}$ aryl group, a $C_6$–$C_{10}$ aryloxy group, a $C_2$–$C_{10}$ alkenyl group, a $C_7$–$C_{40}$ arylalkyl group, a $C_7$–$C_{40}$ alkylaryl group, a $C_8$–$C_{40}$ arylalkenyl group, or a halogen atom;

$R^3$ and $R^4$ are hydrogen atoms;

$R^5$ and $R^6$ are identical or different and are one of a halogen atom, a $C_1$–$C_{10}$ alkyl group which may be halogenated, a $C_6$–$C_{10}$ aryl group which may be halogenated, a $C_2$–$C_{10}$ alkenyl group, a $C_7$–$C_{40}$ arylalkyl group, a $C_7$–$C_{40}$ alkylaryl group, a $C_8$–$C_{40}$ arylalkenyl group, a —$NR^{15}{}_2$, —$SR^{15}$, —$OR^{15}$, —$OSiR^{15}{}_3$, or —$PR^{15}{}_2$ radical, wherein $R^{15}$ is one of a halogen atom, a $C_1$–$C_{10}$ alkyl group, or a $C_6$–$C_{10}$ aryl group;

$R^7$ is

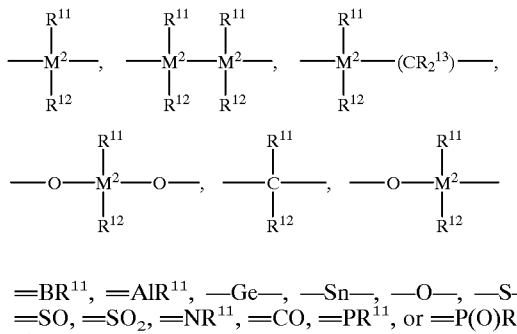

=$BR^{11}$, =$AlR^{11}$, —Ge—, —Sn—, —O—, —S—, =SO, =$SO_2$, =$NR^{11}$, =CO, =$PR^{11}$, or =$P(O)R^{11}$;

wherein:

$R^{11}$, $R^{12}$ and $R^{13}$ are identical or different and are a hydrogen atom, a halogen atom, a $C_1$–$C_{20}$ alkyl group, a $C_1$–$C_{20}$ fluoroalkyl group, a $C_6$–$C_{30}$ aryl group, a $C_6$–$C_{30}$ fluoroaryl group, a $C_1$–$C_{20}$ alkoxy group, a $C_2$–$C_{20}$ alkenyl group, a $C_7$–$C_{40}$ arylalkyl group, a $C_8$–$C_{40}$ arylalkenyl group, $C_7$–$C_{40}$ alkylaryl group, or $R^{11}$ and $R^{12}$, or $R^{11}$ and $R^{13}$, together with the atoms bonded directly to them, form a ring system;

$M^2$ is silicon, germanium or tin;

$R^8$ and $R^9$ are identical or different and have the meanings as stated for $R^{11}$;

m and n are identical or different and are zero, 1 or 2, m plus n being zero, 1 or 2; and the radicals $R^{10}$ are identical or different and have the meanings stated for $R^{11}$, $R^{12}$ and $R^{13}$ wherein further two adjacent $R^{10}$ radicals can be joined together to form a ring system;

b) contacting the mixture with a porous support wherein the total volume of the mixture is in the range of from above one times the total pore volume of the carrier to less than that volume required to form a slurry; and c) removing substantially all the solvent.

23. The method of claim 20 wherein the total volume of the mixture is in the range of from 1.25 times the total pore volume of the support to two times the total pore volume of the support.

24. The method of claim 20 wherein the total volume of the mixture is in the range of from that volume required to form a mud to 1.05 times the total pore volume of the support.

25. The method of claim 20 wherein the porous support is silica.

26. A method for forming a supported catalyst composition, the method comprising contacting a porous support with a liquid containing a metallocene catalyst component and an alumoxane, wherein the total volume of liquid is in the range of from less than that volume required to form a slurry to above one times the total pore volume of the porous support and wherein the metallocene catalyst component is the same as that defined in claim 20.

* * * * *